Figure 1:
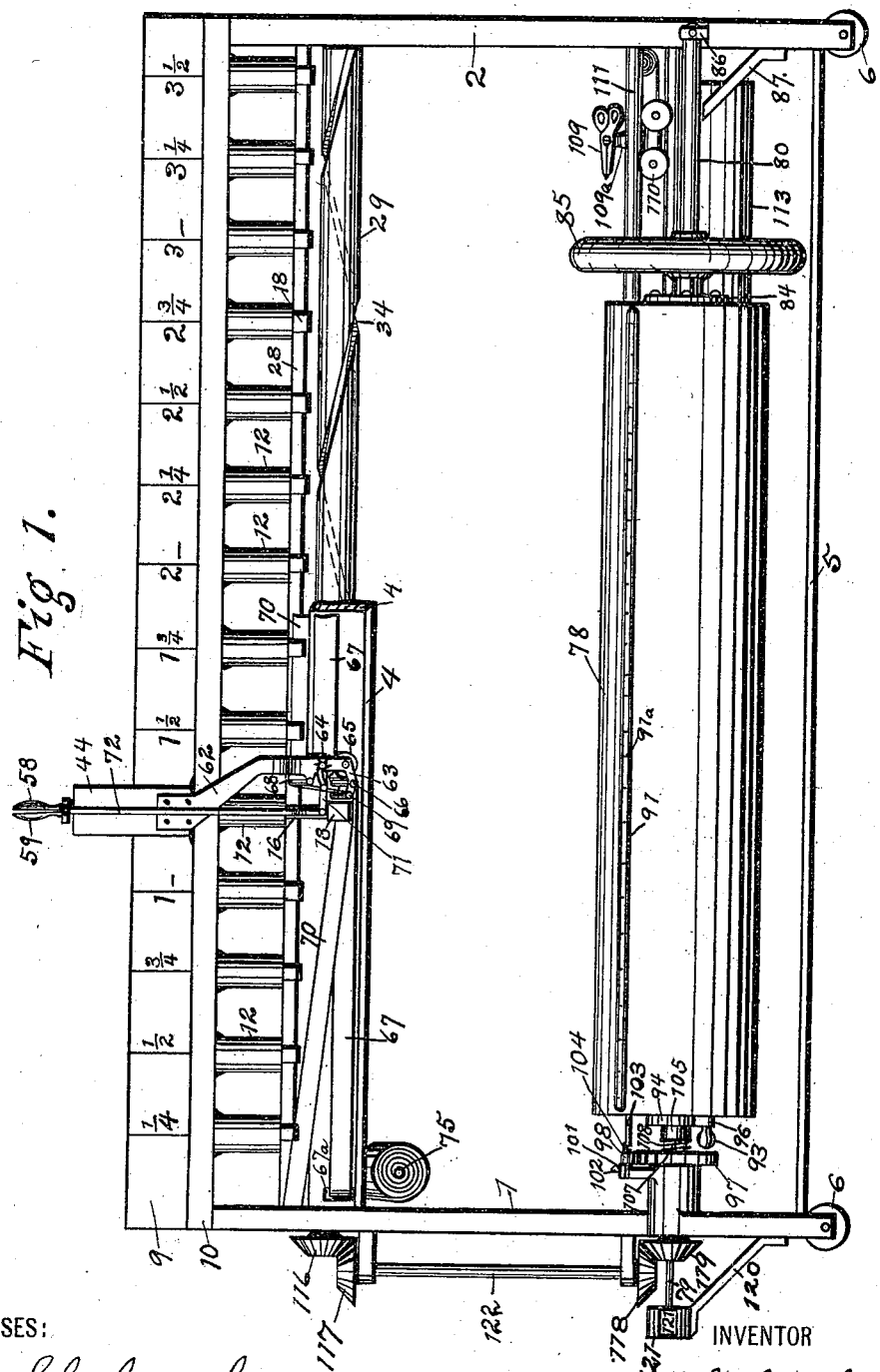

M. SHALANSKY.
CLOTH MEASURING AND RECORDING DEVICE.
APPLICATION FILED SEPT. 27, 1909.

975,373.

Patented Nov. 8, 1910.
4 SHEETS—SHEET 1.

WITNESSES:
Harry Shalansky.
Thomas Colson

INVENTOR
Morris Shalansky

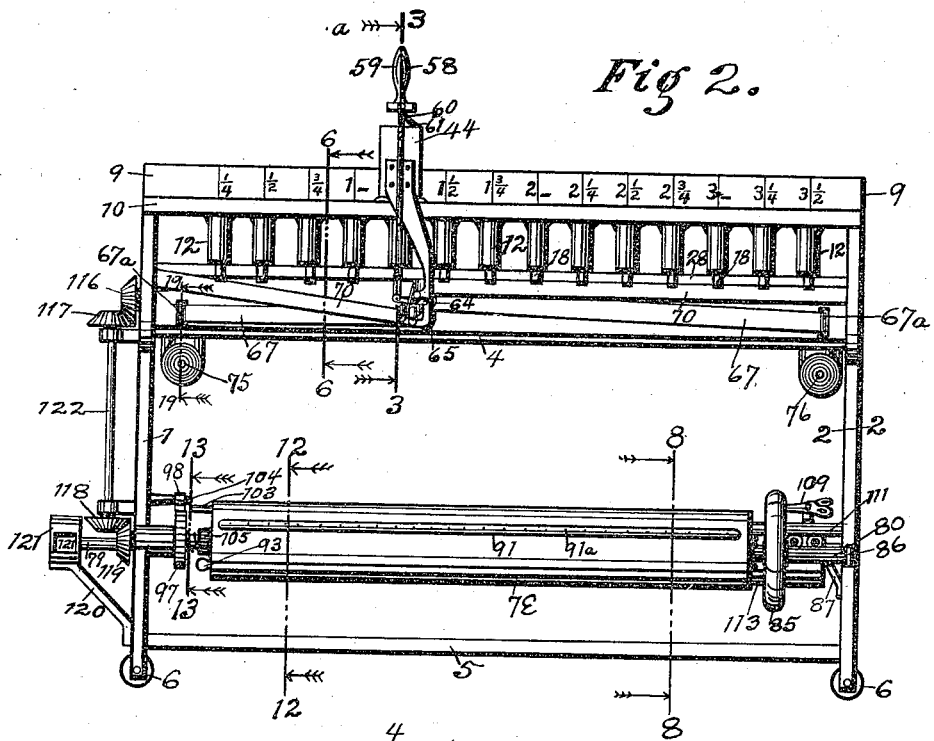
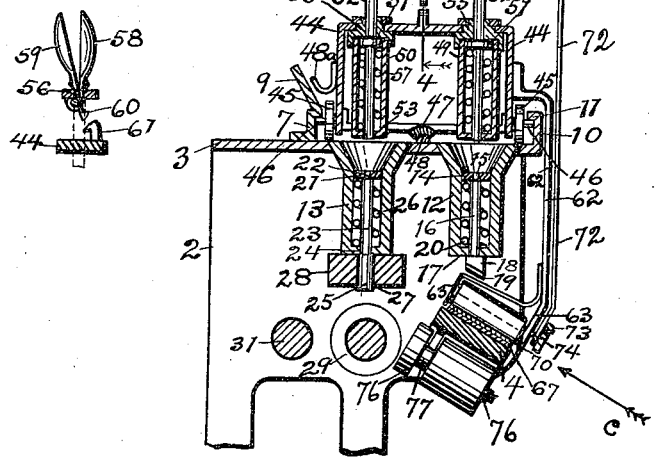
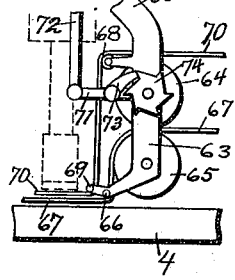

M. SHALANSKY.
CLOTH MEASURING AND RECORDING DEVICE.
APPLICATION FILED SEPT. 27, 1909.
975,373.
Patented Nov. 8, 1910.
4 SHEETS—SHEET 3.
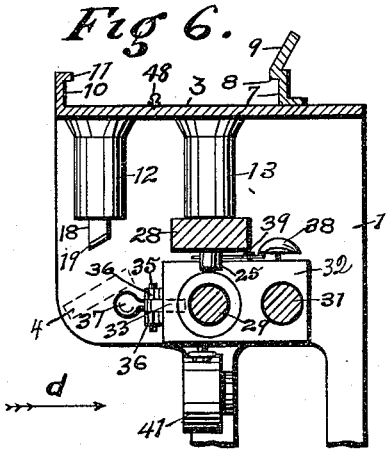
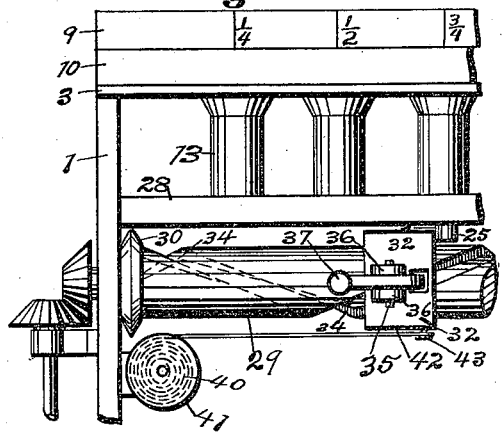
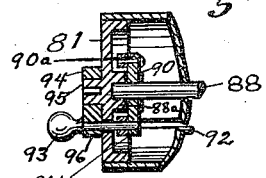
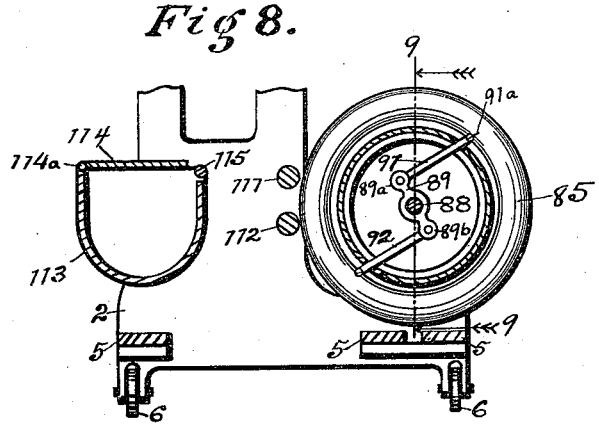
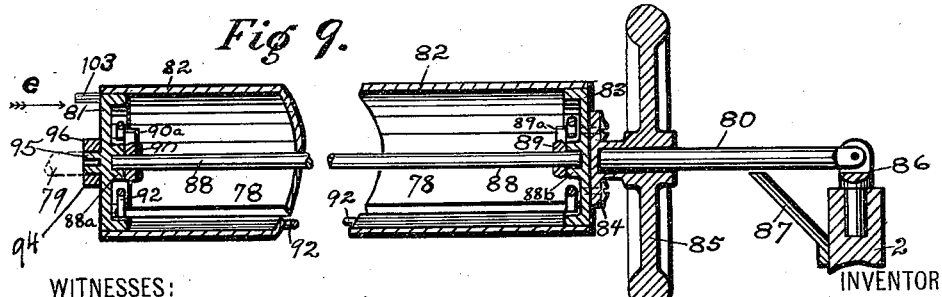
WITNESSES:
Harry Shalansky
Thomas Colson
INVENTOR
Morris Shalansky M. SHALANSKY.
CLOTH MEASURING AND RECORDING DEVICE.
APPLICATION FILED SEPT. 27, 1909.
975,373.
Patented Nov. 8, 1910.
4 SHEETS—SHEET 4.
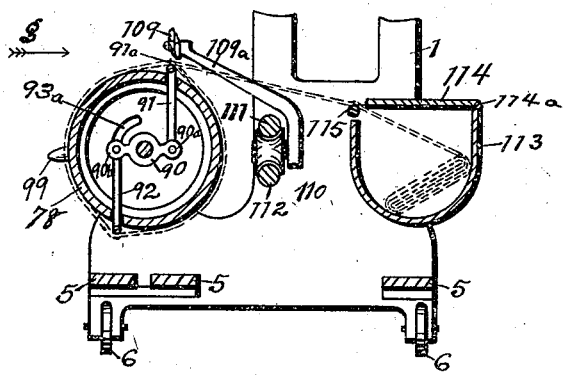
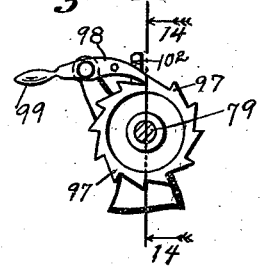
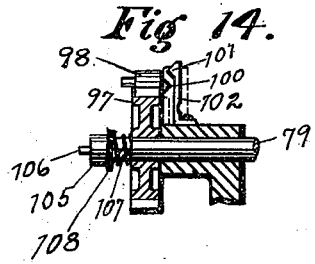
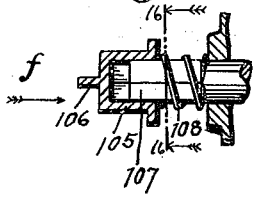
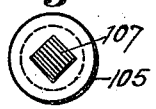
WITNESSES:
Harry Shalansky,
Thomas Colson
INVENTOR
Morris Shalansky

UNITED STATES PATENT OFFICE.

MORRIS SHALANSKY, OF INDIANAPOLIS, INDIANA.

CLOTH MEASURING AND RECORDING DEVICE.

975,373.  Specification of Letters Patent.  Patented Nov. 8, 1910.

Application filed September 27, 1909. Serial No. 519,897.

*To all whom it may concern:*

Be it known that I, MORRIS SHALANSKY, a citizen of the United States, residing at Indianapolis, in the county of Marion and State of Indiana, have invented certain new and useful Improvements in Cloth Measuring and Recording Devices, of which the following is a specification, reference being made therein to the accompanying drawings.

My invention relates to improvements in machines for measuring, recording and cutting off desired lengths of cloth, hereinafter described in this specification and particularly pointed out in the claims.

The object of this invention is first to measure the length of a piece of cloth and cut it off. The piece to correspond to a predetermined dimension, next to record the dimension of the piece cut off or sold. I attain these objects by means of the apparatus illustrated in the accompanying drawings in which like numerals of reference designate like parts.

Figure 1. is an enlarged front elevation of the cloth measuring and recording machine with a part of the recording table removed; Fig. 2. is a reduced front elevation of the machine; Fig. 3. is an enlarged detail broken off section taken along the line 3—3 in Fig. 2, looking in direction of the arrow (*a*); Fig. 4. is a detail of the latch and catch of the piston rod presser looking in the direction of the arrow (*b*) Fig. 3; Fig. 5. is a broken detail view of the ribbon and paper guiding rollers looking in the direction of the arrow (*c*) in Fig. 3; Fig. 6. is an enlarged broken off detail of the top portion of the machine taken along the line 6—6 in Fig. 2, looking in the direction of the arrows; Fig. 7. is a front view of the same showing the recording table removed and looking in the direction of the arrow (*d*) in Fig. 6; Fig. 8. is an enlarged broken detail section of the lower portion of the machine taken along the line 8—8 in Fig. 2; looking in the direction of the arrows; Fig. 9. is an enlarged detail longitudinal section of the cloth measuring roller taken along the line 9—9 in Fig. 8, looking in the direction of the arrows; Fig. 10. is an end view of the measuring roller looking in the direction of the arrow (*e*) in Fig. 9; Fig. 11. is a broken section of the same taken along the line 11—11 in Fig. 10, and looking in the direction of the arrows; Fig. 12. is an enlarged broken off detail section of the bottom portion of the machine taken along the line 12—12 in Fig. 2, looking in the direction of the arrows; Fig. 13, is a transverse broken section taken along the line 13—13 in Fig. 2, looking in the direction of the arrows, and showing the pawl and ratchet of the measuring roller; Fig. 14, is a longitudinal section of the same taken along the line 14—14 in Fig. 13; Fig. 15, is an enlarged detail longitudinal sectional broken off portion of the trunnion of the measuring roller shaft shown in Fig. 14; Fig. 16, is a transverse section taken along the line 16—16 in Fig. 15; Fig. 17, is an end view of the same looking in the direction of the arrow (*f*) in Fig. 15; Fig. 18, is a broken detail view of the scissors and the supporting carriage thereof, looking in the direction of the arrow (*g*) in Fig. 12; and, Fig. 19, is an enlarged broken detail section of the paper roll and its actuating spring, taken along the line 19—19 in Fig. 2, looking in the direction of the arrows.

I will now proceed to describe my invention in such clear, concise and exact terms that those skilled in the art to which it appertains may make and use the same.

Referring particularly to Figs. 1, and 2, the housings or end frames 1 and 2 are secured in parallel relation to each other and at their proper distance apart by the top plate 3, which is secured at its ends to the top portions of said housings, the table 4, Fig. 3 which is inclined toward the front extends between said housings and is suitably secured at its ends to said housings, and the bottom rail 5, secured to the bottom portions of said housings or end frames. The casters or rollers 6 are provided for the purpose of supporting the machine and making it easily moved from place to place.

On the top plate 3 is secured the guide rail 7 which extends longitudinally of said plate and integral with said rail is formed the flange 8 and the gage 9 the face of which is graduated to any suitable scale, as ¼ yard, ½ yard, ¾ yard, 1 yard, &c. Situated opposite and parallel to the rail 7 is the rail 10 which is formed integral with the top plate 3 and said rail is provided with the integral flange 11 similar to the flange 8 and provided for the same purpose which will be hereinafter described.

Each of the front row of depending tubes 12 are alike in form and construction and likewise each of the back row of depending tubes 13 are alike in form and construction. The tubes 12 of the front row are arranged in a straight line at regular intervals apart. Directly back of each tube 12 is situated a companion tube 13, which latter are also arranged in a line, and parallel to the row of tubes 12.

Each of the tubes 12 being alike in form, construction and operation, the description of one will suffice. The piston 14 fits in the bore of the tube 12 and is adapted to freely slide longitudinally therein. The piston 14 is secured on the top reduced end 15 of the piston rod 16, the said piston rod extends downwardly through the bore formed in the bottom closed end 17 of the tube 12 and is adapted to slide freely therein. A type head 18 is formed on the lower end of the piston rod 16 to which is attached a type 19 corresponding to the measure indicated at that point on the gage 9. The spring 20 is situated inside the tube 12 and around the piston rod 16 and is provided for the purpose of resiliently holding and returning the piston and type to their highest positions.

Each of the tubes 13 being alike in form, construction and operation the description of one will suffice. The piston 21 fits the bore of the tube 13 and is adapted to freely slide longitudinally therein. The piston 21 is secured to the top reduced end 22 of the piston rod 23, the said piston rod extends downwardly through the bore formed in the bottom closed end 24 of the tube 13 and is adapted to slide therein. The enlarged portion 25 of the piston rod 23 is adapted to slidingly fit in the opening 27 of the guide bar 28. Said enlarged portion 25, when moved to its lowest position, forms a stop for the movable block 32 Fig. 7. The spring 26 is situated inside the tube 13 and around the piston rod 23 in such a manner as to resiliently maintain and return the piston and enlarged portion to their highest positions. The guide bar 28 is suitably secured at its ends to the end frames 1 and 2, and contains a number of openings 27 at regular intervals corresponding to and immediately beneath the tubes 13.
The screw 29 is suitably mounted at its ends in bearings in the end frames 1 and 2 and in a parallel relation to the top plate 3. Said screw is rotated by means of the bevel gear 116 mounted upon the reduced end of said screw which extends through the end frame 1. The rigidly secured collar 30 Fig. 7 forms a stop for the movable block 32 when said block is in its normal position. The movable block 32 is mounted slidably on the screw 29 and the guide bar 31 as seen in Figs. 3 and 6. Said guide bar is suitably secured to the end frames 1 and 2 and in parallel relation to the screw 29. The movable block 32 is drawn longitudinally on the screw 29 and the guide bar 31 by means of the spring catch 33 Fig. 6 engaging with the thread 34 of said screw. The spring catch 33 is pivotally mounted upon the pin 35, said pin being fitted in the ears 36, and said ears are formed integral with the movable block 32. A knob 37 is provided for the purpose of disengaging the catch 33 from the threads 34 of the screw 29 should it become necessary from any cause. The bell 38 Fig. 6 is provided for the purpose of notifying the operator that the desired measurement has been obtained. The actuating lever 39 Fig. 6 is arranged in suitable manner to engage with the lower portion 25 of the piston rod 23 to ring the bell 38 at the proper time, as above stated. The clock spring 40 Fig. 7, mounted in a suitable housing 41, is arranged to return the movable block 32 over the screw 29 and guide rod 31 to the stop collar 30, ready for taking the next measurement. The housing 41 is secured to the frame 1, and the outside spring end 42 is connected to the block 32 by means of the screw 43.

The movable carriage 44 Figs. 1, 2 and 3 is mounted upon the rollers 45 Fig. 3 in such a way as to traverse the top plate 3 longitudinally. The bearings 46 of the rollers 45 extend under the flanges 8 and 11 thereby sustaining the carriage in an upright position. The guide 47 slides upon the track 48 to facilitate the movement of the carriage 44 over the plate 3. The pointer 48ª (Fig. 3) secured to the side of the carriage 44 indicates that said carriage is immediately over a tube 12 having a type to correspond to that point on the graduated gage 9.

Suitably arranged in a vertical relation to the top plate 3, in carriage 44, are the tubes 49 and 50 situated at proper distances apart to come immediately over the tubes 12 and 13 respectively. The tubes 49 and 50 are alike in form, construction and operation, the piston 51 slidably fits the bore of the said tubes and is formed integral with the piston rod 52, said piston rod extends downwardly slidably through an opening 53 in the bottom closed end of said tubes, and upwardly slidably through openings 54 in the caps 55. Said caps being suitably secured to the carriage 44. Said piston rods are rigidly fixed to the arm 56 at their top ends, in such a manner as to move both simultaneously. The spring 57 is situated inside tubes 49 and 50 and around the piston rods 52 and are provided for the purpose of resiliently holding and returning the piston rods to their highest positions. The handle is divided into two parts, one part 58 is rigidly secured to the arm 56 and the other part 59 is hingedly connected to said arm (Fig. 4). The latch 60 is secured to the portion 59 and arranged to engage with the catch 61 secured to the carriage 44 and is provided for the purpose of locking the piston rods 52 in their lowest positions.

The table 4 is secured at its ends to the end frames 1 and 2 and slopes forward at such an angle to the top plate 3 as to make it easily accessible to the operator. The ribbon and paper guide rollers (Figs. 3 and 5) are supported in a parallel relation to a transverse section of the table 4 by the frame 63, said frame being suspended from and secured to the carriage 44 by the arm 62 in such a manner as to cause the ribbon and paper rollers to traverse longitudinally over and near the table 4, as the carriage 44 is moved longitudinally over the top plate 3. The paper rollers 64 and 65 grip the paper 67 and cause it to be drawn back and forth over the table 4 simultaneously with the movement of the carriage 44. The roller 66 Fig. 5 is provided for the purpose of maintaining the paper 67 close to the table 4 to be printed upon. The rollers 68 and 69 are provided for the purpose of maintaining the ribbon 70 in a suitable position for printing. Said ribbon is secured at its ends to the end frames 1 and 2 and does not move over the table 4 with the paper. The paper 67 is fed through the rollers 64 and 65 a predetermined distance by the ratchet gear actuated by the arm 56 as said paper is printed. Said arm 56 Fig. 3 is connected to the lever 71 Fig. 5 by the connecting rod 72. The pawl 73, hingedly secured to the lever 71, engages with the teeth of the ratchet wheel 74, and said ratchet wheel, being rigidly secured to the roller 64, causes the paper to pass through the rollers 64 and 65, as described, by the upward movement of the arm 56. The paper 67 is kept in tension by the clock spring actuated paper holders 75 and 76. The spring actuated holder 75 letting out and the holder 76 taking up the paper 67 as it is fed through the rollers 64 and 65. Said paper holders are suitably mounted on bearings secured to the under side of the table 4. Said table having suitable openings 67$^a$ Figs. 1 and 2 for passing the paper from the underside of the table to the upper on one end and for returning it again at the other. The paper 67 may be ruled in any manner to suit the demands to be made on the machine.

The drum 78 is supported at its front end, which is the end nearest the driving mechanism upon the trunnion 106 of the shaft 79 and at its rear end, which is the end farthest from the driving mechanism upon the shaft 80. Said drum being made up of the end portion 81 Fig. 9, the cylindrical portion 82, and the end portion 83. The end portion 83 is suitably secured to the flange 84, and said flange is formed integral with the hand wheel 85. Said hand wheel is drilled to fit and turn freely on the shaft 80, said shaft is hingedly connected to the stud 86 and the stud 86 is pivotally connected to the end frame 2. The support 87 is placed in such a position as to support the drum 78 on the shaft 80, when disengaged from the shaft 79 at the end portion 81.

The shaft 88 Fig. 9 is supported rotatably on one end in a bearing 88$^a$ formed integral with the end portion 81 and at the other end in a similar bearing 88$^b$ in the end portion 83. (Figs. 8, 9, 10, 11, and 12.) The double lever 89 is rigidly secured near one end on the shaft 88 and the double lever 90 is rigidly secured near the other end on the shaft 88. The double armed portion 91 is hingedly connected at one end to one part 89$^a$ of the double lever 89 and at the other end to one side 90$^a$ of the double lever 90. The double armed portion 92 is hingedly connected at one end to the other side 89$^b$ of the double lever 89 and at the other end to the other side 90$^b$ of the double lever 90. The double armed portion 91 has a number of pointed projections 91$^a$ extending outwardly from that portion of the said portion 91 which is parallel with the axis of the drum 78. Said pointed projections are provided for the purpose of holding the cloth while being measured. While measuring cloth the portions 91 and 92 are extended from cylinder 78 (Fig. 12) and to remove the cloth the shaft 88 and the double levers 89 and 90 are turned manually by means of the handle 93, Figs. 1 and 11 which handle extends through the slot 93$^a$ to the inner side of the end portion 81 and connects rigidly with the double lever 90, in such a way as to draw the portions 91 and 92 into the drum leaving the cloth loose and free on the drum 78 to be easily removed.

The slitted collar 94 Figs. 9 and 10 is fitted to the extended bearing 95 to turn thereon, and said extended bearing is slitted to receive the trunnion 106 of the shaft 79. The ear 96, formed integral with the slitted collar 94, is rigidly connected to the handle 93 so that it will move simultaneously with said handle, thereby unlocking the trunnion 106 simultaneously with the loosening of the cloth on the drum 78, so that it is possible to disengage the end portion 81 of the drum 78 from the trunnion 106 of the shaft 79 to remove the cloth which has been measured and cut off.

The ratchet wheel 97 is rigidly secured to the shaft 79 (Figs. 1, 2, 12 and 13). The pawl 98 engages with the teeth of the ratchet wheel 97 to prevent said shaft 79 from turning backward until released at the proper time. The handle 99 on the pawl 98 is provided for the purpose of releasing the ratchet wheel at any time it may be necessary to do so. The ear 100 on the pawl 98 (Fig. 14) engages with the ear 101 on the spring 102 to maintain the pawl out of engagement when the pawl is lifted.

The stud 103 situated on the end portion 81 of the drum 78 is in such a position that when the drum is in the unlocking position said stud will come directly under the stud 104, so that when the drum 78 is raised out of engagement with the shaft 79, the stud 103 will engage the stud 104 to raise the pawl 98 out of engagement with the ratchet wheel 97.

The cap portion 105 Figs. 14 and 15 is formed integral with the trunnion 106 and is fitted slidably on the square end portion 107 of shaft 79. Said cap portion is kept in its extended position by means of the spring 108. The spring cap portion is provided for the purpose of unlocking the drum in any position it may be necessary to do so.

The scissors 109 Figs. 12 and 18 are hingedly secured to the carriage 109$^a$, said carriage is mounted on the grooved rollers 110, said rollers are adapted to move longitudinally between the guides 111 and 112 and said guides are in parallel relation with each other and the axis of the drum 78, and secured at their ends to the end frames 1 and 2. The scissors 109 are supported in such a position that the cloth measured may be cut off at the starting point or unlocking position of the drum 78.

The containing receptacle 113 Fig. 12 is secured at its ends to the end frames 1 and 2. The lid portion 114 is hingedly connected to the body 113 at the hinge 114$^a$. The roller 115 is mounted in suitable bearings at its ends in the end portions of the body 113. Said roller is provided for the purpose of reducing the friction of the goods on the edge of the containing body 113. Said container is provided for the purpose of supporting the unmeasured portion of the cloth.

The shaft 79 is geared to the screw 29 by means of the bevel gears 116, 117, 118 and 119 and the shaft 122, in the relation of one revolution of the screw to one revolution of the shaft. Said shaft is in engagement with the drum 78 as already explained, so that the screw 29 moves simultaneously with the drum as stated. The thread 34 on the screw 29 is of such a pitch that the block 32 will be moved a distance equal to the distance between four of the equidistant tubes 13 depended from the top plate 3, at each revolution of said screw, and for each quarter revolution of the drum 78 the screw 29 will turn one-fourth revolution and the block 32 will be moved a distance equal to the distance between a tube 13 to the next tube 13. The distance from point 91$^a$, around the drum 78 with the portions 91 and 92 extended, to said point 91$^a$ is one yard (Fig. 12). The drum may be made larger or smaller as required, and the graduations on the gage 9 changed to correspond therewith.

The counter 121, of an ordinary design, is supported on the support 120 and connected to the shaft 79 in such a manner that it will register only when the shaft is turned in the direction to measure the cloth.

The operation of the machine is as follows:—The operator draws the carriage 44 over the plate 3 until the pointer 48$^a$ Fig. 3 indicates the required measurement on the graduated gage 9 (Fig. 3). The handle 58 and 59 Fig. 4 is pressed downwardly until the latch 60 engages with the catch 61 thereby locking all the pistons in their lowest positions. This downward movement prints the required number of yards to be measured on the paper 67 in a predetermined position by driving the type 19 downwardly pressing the ribbon 70 and the paper 67 against the table 4, and drives the stop 25 down to its lowest position to stop the block 32 Fig. 7 when said block reaches said stop. The roll of cloth to be measured is placed in the container 113, the free end carried over the roller 115 and fastened on the pointed projections 91$^a$. The hand wheel 85 is turned manually until the bell 38 Fig. 6 rings. This movement having turned the screw 29 drew the block 32 thereon to the stop 25 Fig. 3 on the piston 23 immediately under the carriage 44 and registered on the counter 121 the number of yards measured. The scissors 109 are used to cut off the measured portion of the cloth and then returned to the normal position (Fig. 1). The handle 93 is turned in the direction indicated by the slot 93$^a$ (Fig. 10) to draw the portions 91 and 92 into the drum 78, thereby loosening and freeing the cloth on the drum, and simultaneously unlocking the trunnion 106. The drum 78 is lifted manually out of engagement with the shaft 79, and swung toward the operator until the shaft 80 rests upon the support 87 Fig. 9, the cloth is then drawn off over the free end of the drum. The motion of lifting the drum causes the stud 103 to engage the stud 104 raising the pawl 98 out of engagement with the ratchet wheel 97. The latter movement allows the clock spring 40 Fig. 7 to return the block 32 over the screw 29 thereby turning said screw, the connecting gearing and the shaft 79 backward until the said block reaches the stop collar 30, its normal position. The drum 78 is returned to engagement with the shaft 79 and the knob 93 returned to its normal position. The latter movement extends the portions 91 and 92 and locks the trunnion 106 in the bearing 95, their normal positions. The handle portions 58 and 59 Fig. 4 are pressed together to disengage the latch 60 from the catch 61 thereby releasing the arm 56, Fig. 3 which upward movement passes the paper 67 Fig. 5 through the gripping rolls 64 and 65, so that a new position on the paper is ready for recording the next measurement. All parts of the machine are now ready for the next measurement.

I claim:—

1. In a device of the kind described, the combination of a rotative measuring drum comprising a front end portion, a rear end portion, and a cylindrical body portion, the latter having two diametrically opposite longitudinally extending slots, armed portions slidably mounted in said longitudinally extending slots, a plurality of pointed projections secured to one of said armed portions to engage the cloth to be measured, a shaft rotatively mounted inside of and near the axis of said measuring drum, a double lever secured near each end of said shaft, said double levers operatively connected with said armed portions, a circular slot being formed in said front end portion, a stud secured to one end of one of said double levers and extended through said circular slot, a handle secured to said stud, and means for removably securing said measuring drum.

2. In a device of the kind described, the combination of a rotative measuring drum comprising a front end portion, a rear end portion and a cylindrical body portion, the latter having two diametrically opposite longitudinally extending slots, armed portions slidably mounted in said longitudinally extending slots, a plurality of pointed projections secured to one of said armed portions to engage the cloth to be measured, a shaft rotatively mounted inside of and near the axis of said measuring drum, a double lever secured near each end of said shaft, said double levers are operatively connected with said armed portions, a circular slot being formed in said front end portion, a stud secured to one end of one of said double levers and extended through said circular slot, a handle secured to said stud, a supporting shaft provided with a tongue formed integral therewith, a grooved arbor formed on the outside of said front end portion to engage said tongue, and a slitted annular lock rotatably mounted on said grooved arbor and operatively secured to said stud to turn simultaneously with said double levers to lock said tongue in said grooved arbor when said armed portions are extended and to unlock said tongue in said grooved arbor when said armed portions are withdrawn substantially as set forth.

3. In a device of the kind described, the combination with a frame having a top plate, of a graduated gage secured on said top plate, a carriage, guides secured on said top plate to cause said carriage to traverse said top plate longitudinally, a pointer secured to said carriage, two vertically disposed tubes having spring returned piston and piston rods mounted in said carriage, a handle secured to the top ends of the piston rods of said vertically disposed tubes, and a means for locking said handle in its lowest position substantially as described.

4. In a device of the kind described, the combination with a frame having a top plate, of a graduated gage secured thereon, a longitudinally traversing carriage having a pointer and two simultaneously spring returned piston rods mounted on said top plate, a front row of depending tubes secured to said top plate, a rear row of depending tubes secured to said top plate and in parallel relation with said front row of depending tubes, a spring returned piston rod in each tube of said front row and rear row of depending tubes, a type corresponding with the graduations on said graduated gage secured to the lower end of the piston rod of each tube of said front row of tubes, and a stop secured to the lower end of the piston rod of each tube of said rear row of depending tubes.

5. In a device of the kind described, the combination with a frame having a top plate, of a longitudinally traversing carriage monted on said top plate, a front row and a rear parallel row of depending tubes secured to said top plate, a spring returned piston rod in each tube of said front row and said rear parallel row of depending tubes, a type secured to the lower end of the piston rod of each tube of said front row of depending tubes, a ribbon supported under said type, a record paper supported under said ribbon, and a table supported under said record paper as set forth.

6. In a device of the kind described, the combination with a frame having a top plate, of a graduated gage secured on said top plate, a longitudinally traversing carriage mounted on said top plate, a front row and a rear parallel row of depending tubes secured to said top plate, a spring returned piston rod in each tube of said front row and said rear parallel row of depending tubes, means for operating said piston rods, a type corresponding to the graduations of said graduated gage secured to the lower end of the piston rod of each tube of said front row of depending tubes, a ribbon supported under said type, a record paper supported under said ribbon, a pair of record paper gripping rollers suspended from said longitudinally traversing carriage and adapted to automatically feed said record paper a predetermined distance, and a table supported under said record paper substantially as described.

7. In a device of the kind described, the combination with a frame having a top plate, of a graduated gage secured on said top plate, a longitudinally traversing carriage mounted on said top plate, a front row and a rear parallel row of depending tubes secured to said top plate, a spring returned piston rod in each tube of said front row and said rear parallel row of depending tubes, means for operating said piston rods, a type corresponding with the graduations of said graduated gage secured to the lower end of the piston rod of each tube of said front row of depending tubes, a ribbon supported under said type, a pair of record paper gripping rollers suspended from said longitudinally traversing carriage, a table supported under said record paper, a pair of spring actuated record paper holders secured to said table to maintain said record paper in proper tension as described.

8. In a device of the kind described, the combination with a frame having a top plate, of a front row and a rear parallel row of depending tubes secured to said top plate, a spring returned piston rod in each tube of said front row and rear parallel row of depending tubes, a stop secured to the lower end of the piston rod of each tube of said rear row of depending tubes, a rotative measuring drum removably secured in said frame, a rotative screw shaft mounted in said frame and geared to turn with said rotative measuring drum, a movable block adapted to traverse said rotative screw shaft, means for bringing the desired one of said stops in its position to stop said movable block, a clock spring operatively connected with said movable block to return the latter to its normal position, and a counter operatively connected with said measuring drum to register the number of yards of cloth measured, substantially as described.

9. In a device of the kind described, the combination with a frame having a top plate, of a graduated gage having graduations, a plurality of types and an equal number of stops operatively secured to said top plate and corresponding with the graduations of said graduated gage, a means for simultaneously operating one of said types and a corresponding one of said stops, a record paper secured to coöperate with any one of said types to print the number of yards measured, a means for feeding said record paper into a new position after being printed upon, a screw shaft rotatively mounted in said frame, a block slidably mounted on said screw shaft to engage any desired one of said stops, a measuring drum removably mounted in said frame, and a means for connecting said screw shaft with said measuring drum to turn therewith.

In testimony that I claim the above I hereunto set my hand.

MORRIS SHALANSKY.

Witnesses:
HARRY SHALANSKY,
THOMAS COLSON.